No. 615,851. Patented Dec. 13, 1898.
W. C. HOOKER.
ANIMAL TRAP.
(Application filed Feb. 1, 1898.)
(No Model.)
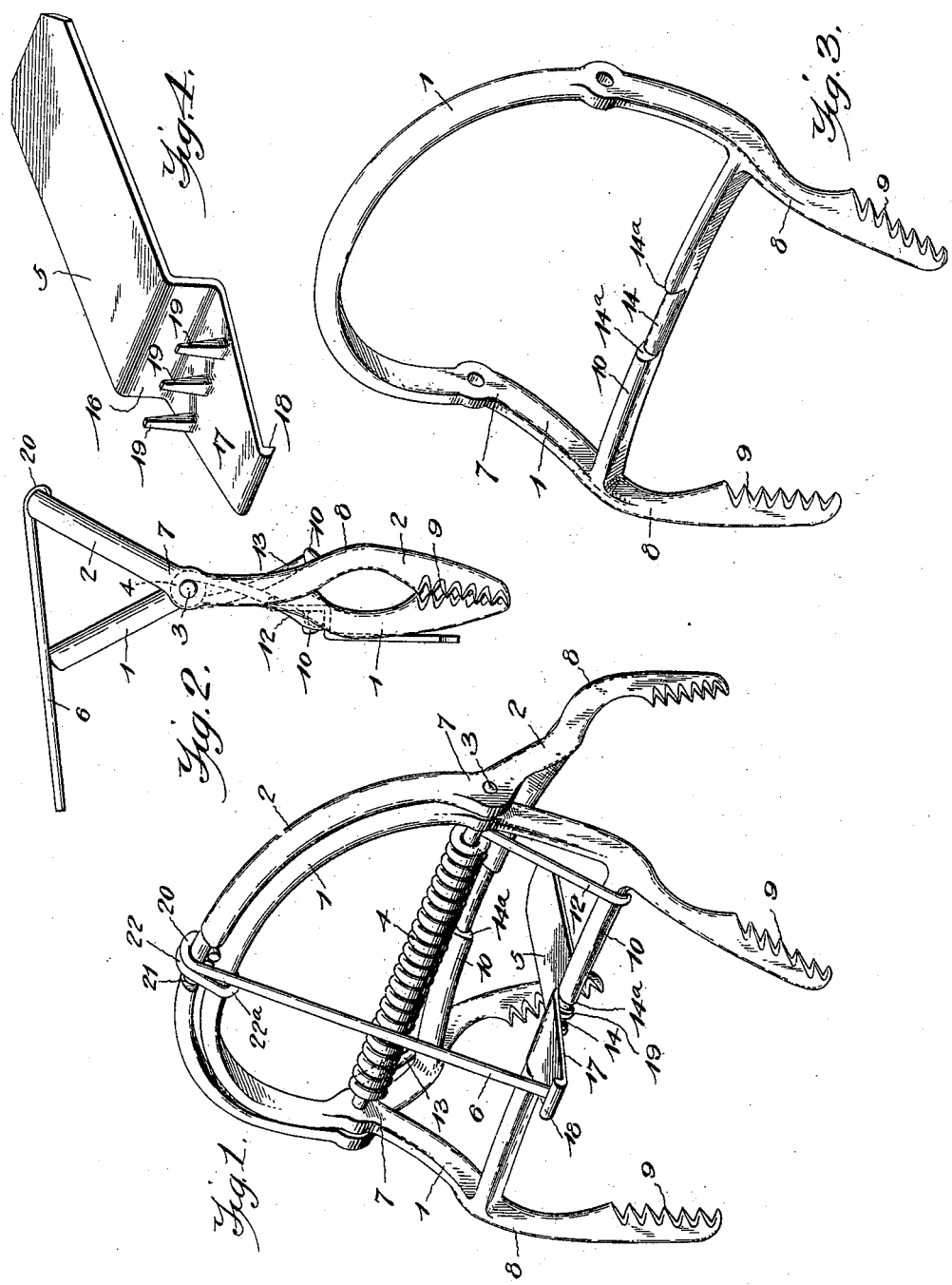
Witnesses
William C. Hooker, Inventor.
By his Attorneys,

UNITED STATES PATENT OFFICE.

WILLIAM C. HOOKER, OF ABINGDON, ILLINOIS.

ANIMAL-TRAP.

SPECIFICATION forming part of Letters Patent No. 615,851, dated December 13, 1898.

Application filed February 1, 1898. Serial No. 668,743. (No model.)

*To all whom it may concern:*

Be it known that I, WILLIAM C. HOOKER, a citizen of the United States, residing at Abingdon, in the county of Knox and State of Illinois, have invented a new and useful Animal-Trap, of which the following is a specification.

This invention relates to improvements in animal-traps of that class especially designed for catching moles and which employ a pair of hinged jaws normally pressed together by a spring and adapted to be controlled by a trigger.

One of the objects of my invention is to provide an improved construction of trap which is adapted to be set or placed in the ground across the line of the burrow or runway and which has its trip-pan lying between the spaces of the jaws, so as to intercept the progress of the animal when moving in either direction through the burrow or runway.

A further object of the invention is to simplify the construction and render the trap efficient and reliable in service, easy of adjustment and control, and cheap of manufacture.

With these ends in view the invention consists of a trap comprising two bail-like members pivoted together at points intermediate of their length and having their free ends formed to provide coacting jaws, a spring supported within the trap and acting against the jaws to normally force them together, a trip-pan hung on one of the members to occupy a position transversely across the space between the jaws, and a trigger connected with the other member and engaging with said trip-pan; and the invention further consists in the novel construction and arrangement of parts, which will be hereinafter fully described and claimed.

To enable others to understand my invention, I have illustrated the same in the accompanying drawings, forming a part of this specification, and in which—

Figure 1 is a perspective view of a mole-trap, showing the parts adjusted to their opened or spread positions. Fig. 2 is a side elevation of the trap when it is sprung. Fig. 3 is a detail perspective view of one of the members of the trap. Fig. 4 is a detail view of the trip-pan.

Like numerals of reference denote like and corresponding parts in each of the several figures of the drawings.

My improved trap consists of the two members 1 2, a pivot rod or bolt 3, which connects the two members together, a coiled spring 4, fitted on said rod or bolt and having its arms in operative relation to the two members of the trap, a trip-pan 5, hung on one of the members of the trap, and a trigger 6. These elements are assembled together in the relation to each other illustrated by the drawings, and I will now proceed to describe in detail the construction of the several parts.

Each member of the trap 1 or 2 is cast or otherwise produced in a single piece of metal. The trap member is substantially bail-shaped, as represented by Fig. 3, and the curved or rounded end of the bail is deflected or bent laterally at an angle to the line of the sides of said bail, as represented at 7 in the drawings. The ends of the bail-shaped member are preferably curved, as at 8, and the extremities of the member are provided with teeth or serrations 9, which form the jaws on the ends of the bail-like member. Each member is further provided with a cross-bar 10, which joins the sides of the bail-like member together at a point within the jaws 9 thereof, and at the line where the inclined loop-shaped end of the bail joins with the sides thereof I provide the member with the transverse openings 7. In assembling the two members of the trap together they are fitted to have the eye-formed or perforated parts of one member lie within the corresponding part of the other member, so that the openings 7 coincide or register with each other, and in thus assembling the trap members to receive the pivot bolt or rod 3 the inclined loop-shaped ends of the bails are deflected laterally, while the jaws 9 are curved oppositely to each other, so that the serrated faces or edges of said jaws will pass one another.

The coiled spring 4 is a stout piece of wire of a sufficient length to fit on the pivot rod or bolt between the sides of one of the bail-shaped members, and said spring has its ends extended to form the arms 12 13, one of the arms at one end of the spring being arranged to bear against the cross-bar 10 of the member 1, while the other arm at the opposite end of the spring is extended to bear against the cross-bar 10 of the member 2. This spring is arranged compactly within the trap to be entirely out of the way, and these arms at opposite ends thereof engage with the trap members to normally force the jaws thereon toward each other.

The cross-bar 10 on one of the jaws is provided with a central recess 14, which is of such length as to receive the pivotal part of the trip-pan 5. By forming the recess on the cross-bar 10 the shoulders 14ª are provided at opposite ends of said recess to prevent the pivotal part of the trip-pan from endwise movement on the cross-bar, and thus limit the displacement of said trip-pan from its central position between the jaws of the trap members. In the preferred construction of this trip-pan I form near one end thereof the angular bend 16, from which extends the heel 17, the free end of which heel is formed with a lip or flange 18. On the lower or under side of the extended heel 17 of the trip-pan and at a suitable distance in rear of the offstanding bend 16 of said trip-pan I provide the fingers 19. The recessed part 14 of the cross-bar 10 is rounded between the shoulders 14ª, thus forming practically a pintle at the central part of the cross-bar, and the trip-pan is so fitted to the recessed part of the cross-bar that its fingers 19 fit partly around the cross-bar on one side thereof, while its offstanding bend 16 bears against the opposite side of the recessed part of said cross-bar. The fingers 19 of the trip-pan may be slightly bent to closely embrace the cross-bar 10, and the trip-pan is thus pivotally connected to the cross-bar to turn freely thereon.

From the foregoing description it will be apparent that the trip-pan is loosely fitted to the cross-bar of one of the trap members, so as to oscillate thereon, and the long end of said trip-pan projects from one side of the cross-bar, while the heel 17 extends from the opposite side of the cross-bar. The described construction provides a very simple type of trip-pan which is made or cast in a single piece of metal and is adapted for ready application to the cross-bar of the trap.

The trigger 6 consists, preferably, of a single piece of stout wire having one end thereof bent to form the loop or eye 20. This loop or eye of the trigger is fitted loosely in a recessed part 21 of the looped end of one member of the trap, and said trigger is adapted to have its free end engaged with the rib or flange 18 of the heel 17 of the trip-pan.

I provide my trap with a detent 22, which is loosely connected to the recessed part of the trap member, having the looped end 20 of the trigger fitted loosely thereon, and this detent is provided with a hook 22ª, which is adapted to engage with the looped end of the other bail-like trap member for the purpose of holding the jaws of the trap in their open position while the trap is being placed in the ground across the runway or burrow of the animal.

In setting the trap for service the loop-shaped ends of the bail members are pressed together to force the jaws apart and the jaws are pressed into the ground to lie on opposite sides of the burrow and have the trap span or extend across the line of the burrow. The operation of spreading the jaws apart brings the looped end of one member within the corresponding end of the other member, and the trigger is now adjusted to have its free end engage with the lip or flange on the heel of the trip-pan, said trigger having one end engaged with one member of the trap and pressing against the looped part of the other member of the trap, substantially as shown by Fig. 1. The pressure of the spring against one member of the trap and the pressure of said trap member against the trigger forces the latter firmly against the flange or lip on the heel of the trip-pan, and said trip-pan is thus held in a substantially horizontal position across the line of the burrow or runway of the animal. When the animal passes in either direction through the burrow, it travels between the spread jaws of the trap, and as it strikes the trip-pan the free end of the latter is raised to withdraw the heel from engagement with the trigger, and thus free the members from the restraint of the trigger and pan, whereby the spring is allowed to recoil and press the members forcibly together to cause the jaws to grasp the animal.

The detent connected to one jaw and adapted to engage with the other jaw is useful in that the trap may be fastened in its set position preliminary to thrusting the jaws thereof into the ground; but it will be understood that the detent is released from one member after the trap is set for operation across the burrow.

One of the important features of my improved trap consists in its construction whereby the trap is made to straddle the line of the burrow and its jaws are adapted to lie on opposite sides of said burrow, so that the trip-pan will assume a position across the burrow and serve to release the trap, no matter in which direction the animal traverses the burrow.

The improvement is simple and durable in construction, cheap of manufacture, and is reliable and efficient in operation.

It is evident that changes in the form and proportion of parts may be made by a skilled mechanic without departing from the spirit or sacrificing the advantages of the invention.

Having thus described the invention, what I claim is—

1. In an animal-trap, the combination with the members, one of which is provided with a recessed cross-bar, of an offset trip-pan having a flanged heel and fingers arranged in connection with said offset to loosely embrace the recessed part of the cross-bar and pivotally connect the trip-pan thereto, and a trigger, substantially as and for the purposes described.

2. An animal-trap comprising the bowed pivoted members, a spring, a trip pivoted to one of said members at a point below and independently of the pivotal connection between said jaws and adapted to occupy a horizontal position transversely across the space between the jaws when the latter are spread to lie on opposite sides of a mole-burrow, and a trigger connected to the other trap member and arranged to engage with said trip, substantially as described.

3. An animal-trap comprising bowed pivoted members having the coacting jaws and one of said members provided above its jaws with a cross-bar, a spring tending to normally force the jaws together, a trip mounted loosely at a point intermediate of its length on said cross-bar of the trap member to be restrained thereby against sliding edgewise displacement and arranged to occupy a central longitudinal position across the space between the jaws of the trap when spread, and a trigger pivoted to the other trap member and engaging detachably with the heel of said trip, substantially as described.

4. An animal-trap comprising bowed spring-controlled jaws, one having a shouldered cross-bar, a flanged trip fitted loosely on said cross-bar between the shoulders thereof to be confined against edgewise displacement, and a trigger connected to the other trap member and arranged to engage detachably with the trip, substantially as described.

5. An animal-trap comprising bowed members provided at points between the jaws and their pivotal attachment with cross-bars, a pivotal rod passing through said jaws, a coiled spring fitted on said pivotal rod and having the extended arms which engage with the cross-bars of the respective members, a trip mounted on one of said cross-bars, and a trigger, substantially as described.

6. An animal-trap comprising bowed pivoted members one of which is provided with spaced shoulders at its bowed portion, a trigger loosely fitted to the bowed portion of the member between the shoulders thereof, a spring actuating said jaws, and a trip-pan mounted loosely on the other member of the trap and held against edgewise displacement thereon for engagement with the free end of the trigger, substantially as described.

7. An animal-trap comprising pivoted members, a spring, a detent loosely attached to one member and adapted to engage detachably with the other member to restrain said members against the action of the spring, a trip attached to one trap member, and a trigger connected to the other trap member, substantially as described.

In testimony that I claim the foregoing as my own I have hereto affixed my signature in the presence of two witnesses.

WILLIAM C. HOOKER.

Witnesses:
LEWIS H. ROBERTSON,
GEORGE W. SHOOP.